Dec. 19, 1933.     W. E. SHEHAN ET AL     1,939,727
WIND WING MOUNTING
Filed March 4, 1931
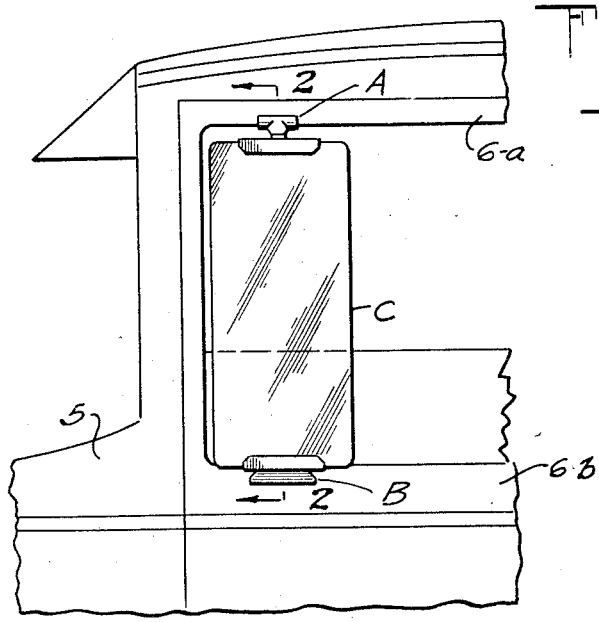
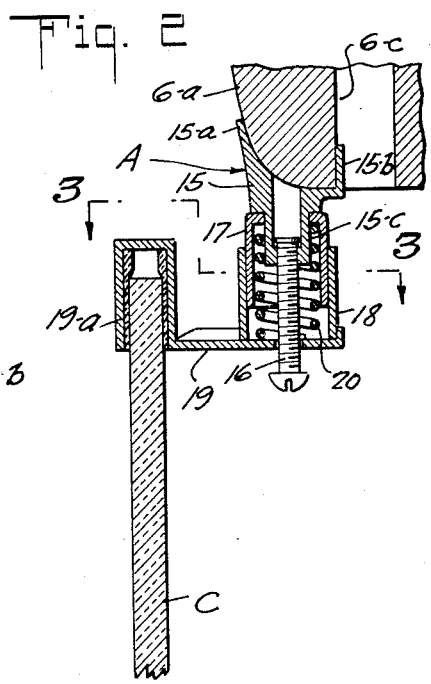
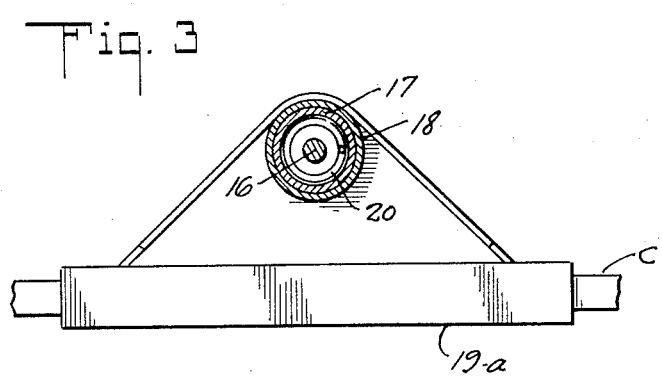
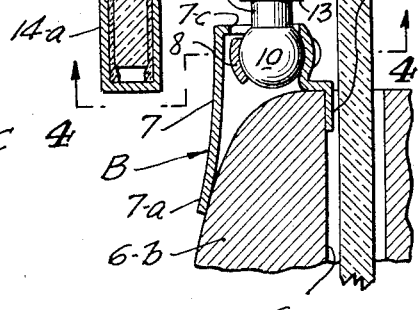
INVENTORS
William E. Shehan
BY Godfrey Bell
Westall and Wallace
ATTORNEYS Patented Dec. 19, 1933

1,939,727

UNITED STATES PATENT OFFICE 1,939,727

WIND WING MOUNTING

William E. Shehan and Godfrey Bell, Los Angeles, Calif.

Application March 4, 1931. Serial No. 519,984

6 Claims. (Cl. 296—84)

This invention relates to a wind wing adapted to be mounted at windows of vehicles, such as automobiles, for deflecting air currents away from passage through the window opening and preventing drafts. The invention appertains more particularly to the mounting whereby the wing may be installed on the body of a closed automobile.

The invention has for its objects any or all of the following features: a simple mounting which is compact; a mounting which is self alining in relation to clamping of the window pane and adjusts itself to weaving or warping of the frame, inaccuracies of placement by the installer; a mounting which enables adjustable swinging of the pane and is ornate; and details of structure contributing to attainment of the before mentioned features.

An embodiment of the invention is illustrated in the accompanying drawing, in which:—

Fig. 1 is a side view of a fragment of an automobile with a wind wing installed at the front window; Fig. 2 is a section as seen on the plane 2—2 of Fig. 1; Figs. 3 and 4 are sections as seen on the planes correspondingly numbered in Fig. 2.

Referring more particularly to the drawing, Fig. 1 shows one of the air wings mounted at the forward door of an automobile. A similar air wing may be mounted upon the front door at the opposite side of the body and wings also upon the rear doors, if desired. However, the wings and their mountings are of like construction and only one is described herein.

The automobile body 5 has a window opening formed by a frame including upward and lower ledges marked respectively 6a and 6b. A runway for the window pane is marked 6c. This is the standard construction for automobile bodies. At the top ledge of the window frame is a bracket A and at the bottom is a bracket B. A glass pane C is clamped between the brackets.

Bracket B comprises a foot base 7 of channel form having a toe 7a to overhang the outer face of the door frame and a heel 7b to engage in the runway 6c. A pocket is provided in the foot 7 having an opening 7c. The wall of the pocket adjacent to the heel is swelled outwardly to form a portion of a socket. Coacting with the swelled portion of the pocket is a socket member 8 which is adjustably held in place by screws 9. A split socket is thus formed. Mounted in the socket is a ball 10 having a pin end 11 with a nut 12 and washer 13. Mounted upon the pin between the nut and the washer is a clamping member 14 with a channel 14a for receiving the pane C, suitable packing being disposed in the channel to protect the pane. The clamping member may be swung about the pin 11 to adjust the angular position of the pane.

The other bracket comprises a foot base 15 having a toe 15a and a heel 15b. An extension of cylindrical form is provided to form a boss 15c and a bore tapped at the outer end has a screw pin 16 mounted therein. A telescopic post is mounted over the boss and pin and comprises nested tubular members 17 and 18. Tubular member 17 seats upon the shoulder at the bottom of the boss, and disposed upon tubular member 18 is a pane clamping member 19 having a channel 19a to receive the pane C. Within the telescopic post is a compression spring 20 tending to expand the post. Screw pin 16 limits the expansion and holds the parts of the post in assembled relation.

In the installation of the wind wing, bracket A is placed in position against the upper ledge of the window frame and bracket B against the lower ledge of the window frame. The bearing axes of the bracket are placed substantially in alinement. The telescopic post is resiliently expansible and the pane C is placed in position. Obviously, the resilient post in bracket A will accommodate itself to the length of the pane and will hold the latter against any weaving or warping which may occur in the body at the window frame. It also accommodates itself to any inaccuracies in placement of the brackets. The ball and socket joint in bracket B provides self alinement for the swinging axis of the wind wing. It is also apparent, that if the door frame is not rectangular but deviates therefrom, that the brackets will aline and accommodate themselves to the form of the window so that binding of the wind wing in swinging will not occur.

What we claim is:—

1. A wind wing comprising brackets adapted for mounting on the window frame of an automobile on the upper and lower ledges thereof: one of said brackets comprising a foot having a heel to engage in the window pane runway and a toe to overhang the outer face of the door, a socket on said foot, a clamping member having a ball disposed in said socket and a channel to receive a pane of glass; the other bracket comprising a foot to rest on the opposite ledge of said frame, a pivotal clamping member having a pane receiving channel, telescopically nested tubular members securing said foot to said clamping member, and a resilient compression member in said tubular member tending to expand the latter.

2. A wind wing comprising brackets adapted for mounting on the window frame of an automobile on the upper and lower ledges thereof: one of said brackets comprising a foot having a heel to engage in the window pane runway and a toe to overhang the outer face of the door, a socket on said foot, a pivotal clamping member having a ball disposed in said socket and a channel to receive a pane of glass; the other bracket comprising a foot to rest on the opposite ledge of said frame, a pivotal clamping member having a pane receiving channel, telescopically nested tubular members securing said foot to said clamping member, a resilient compression member in said tubular member tending to expand the latter, and a pin secured to said foot to limit expansion of said tubular members.

3. A wind wing comprising brackets adapted for mounting on the window frame of an automobile on the upper and lower ledges thereof: one of said brackets comprising a foot having a heel to engage in the window pane runway and a toe to overhang the outer face of the door, a socket on said foot, a pivotal clamping member having a ball disposed in said socket and a channel to receive a pane of glass; the other bracket comprising a foot having a heel to engage in the window pane runway and a toe to overhang the outer face of the door, a pivotal clamping member having a pane receiving channel, telescopically nested tubular members securing said foot to said clamping member, and a resilient compression member in said tubular member tending to expand the latter.

4. A wind wing comprising brackets adapted for mounting on the window frame of an automobile on the upper and lower ledges thereof: one of said brackets comprising a foot having a heel to engage in the window pane runway and a toe to overhang the outer face of the door, a socket on said foot, a pivotal clamping member having a ball disposed in said socket and a channel to receive a pane of glass; the other bracket comprising a foot having a heel to engage in the window pane runway and a toe to overhang the outer face of the door, a pivotal clamping member having a pane receiving channel, telescopically nested tubular members securing said foot to said clamping member, a resilient compression member in said tubular member tending to expand the later, and a pin secured to said foot to limit expansion of said tubular members.

5. A wind wing comprising brackets adapted for mounting on the window frame of an automobile on the upper and lower edges thereof: one of said brackets comprising a foot having a heel to engage in the window pane runway and a toe to overhang the outer face of the door, a member coacting with said foot to form a split socket, screws securing said member to said foot to form an adjustable grip, a pivotal clamping member having a ball disposed in said socket and a channel to receive a pane of glass; the other bracket comprising a foot having a heel to engage in the window pane runway and a toe to overhang the outer face of the door, a pivotal clamping member having a pane receiving channel, telescopically nested tubular members securing said foot to said clamping member, a resilient compression member in said tubular member tending to expand the latter, and a screw pin secured to said foot to limit expansion of said tubular members.

6. A wind wing comprising brackets adapted for mounting on the window frame of an automobile on the upper and lower ledges thereof: one of said brackets comprising a foot having a heel to engage in the window pane runway and a toe to overhang the outer face of the door, a socket on said foot, a clamping member having a ball disposed in said socket and a channel to receive a pane of glass; the other bracket comprising a foot to rest on the opposite ledge of said frame, a pivotal clamping member having a pane receiving channel, a resiliently expansible member securing said foot to said clamping member and tending to hold the clamping member away from said foot.

WILLIAM E. SHEHAN.
GODFREY BELL.